Figure 1:
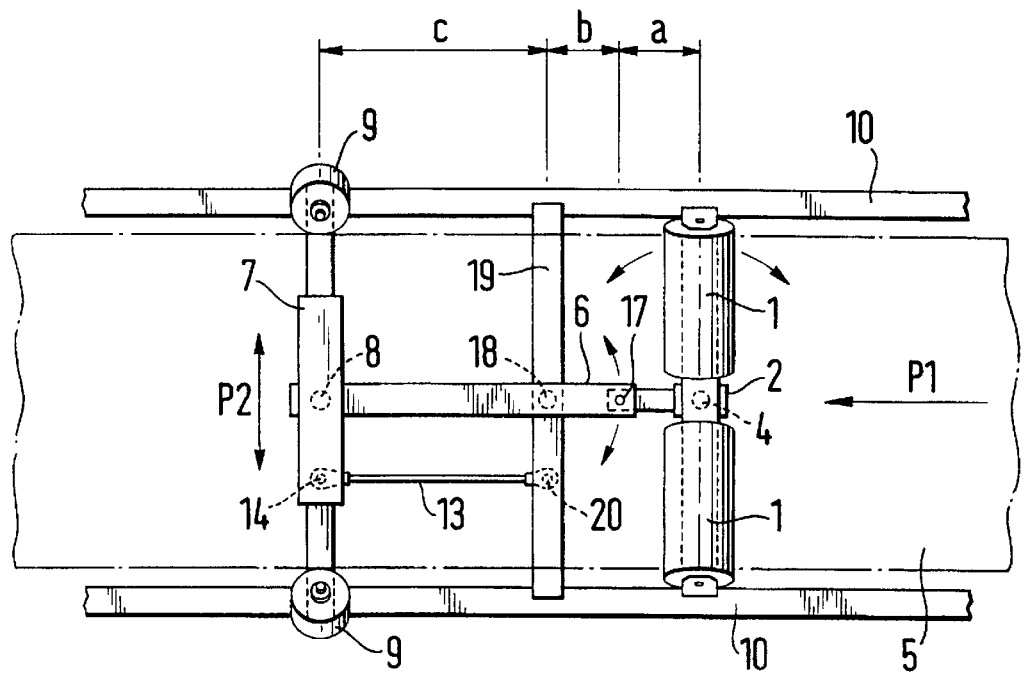

United States Patent

Hovsto et al.

[11] Patent Number: 6,131,726
[45] Date of Patent: Oct. 17, 2000

[54] BELT STEERING ASSEMBLY FOR CENTERING CONVEYOR BELTS

[75] Inventors: Kenneth Hovsto, Heistad; Kjell Arne Gaarden, Heroya, both of Norway

[73] Assignee: A/S Techno Track, Porsgrunn, Norway

[21] Appl. No.: 09/194,674

[22] PCT Filed: May 28, 1997

[86] PCT No.: PCT/NO97/00135

§ 371 Date: Dec. 28, 1998

§ 102(e) Date: Dec. 28, 1998

[87] PCT Pub. No.: WO97/45345

PCT Pub. Date: Dec. 4, 1997

[30] Foreign Application Priority Data

May 31, 1996 [NO] Norway ................................. 962268
Nov. 6, 1996 [NO] Norway ................................. 964702

[51] Int. Cl.[7] .................................................. B65G 39/16
[52] U.S. Cl. .......................... 198/806; 198/808; 198/840
[58] Field of Search .................................. 198/806, 808, 198/810.03, 840

[56] References Cited

U.S. PATENT DOCUMENTS 3,058,574 10/1962 Gianukos ............................ 198/806
5,743,378 4/1998 Hovsto et al. ....................... 198/806

FOREIGN PATENT DOCUMENTS

| 2 110 382 | 6/1972 | France . |
| 2 117 781 | 7/1972 | France . |
| 178853 | 6/1996 | Norway . |
| 344367 | 3/1960 | Switzerland . |
| 491800 | 7/1970 | Switzerland . |
| 609-690 | 6/1978 | U.S.S.R. ........................ 198/808 |

*Primary Examiner*—Christopher P. Ellis
*Assistant Examiner*—Mark A. Deuble
*Attorney, Agent, or Firm*—Young & Thompson

[57] ABSTRACT

A belt steering assembly for centering of conveyor belts (5) comprises a mechanism with steering rollers (1) and guide rollers (9). In the event of a lateral misalignment of the belt (5), the belt's movement will be transferred from the guide rollers (9) to the steering rollers (1), with the result that the steering rollers return the belt to a neutral position. Preferred ratios are described between different lengths of a lever arm (6) for transfer of the movement. A method for loading of a conveyor belt comprises moving the conveyor belt (5) laterally before loading to a position where the centre of gravity of the loaded material (15) falls on the conveyor belt's central portion (12), and after loading steering the conveyor belt laterally to its neutral position.

7 Claims, 3 Drawing Sheets

BELT STEERING ASSEMBLY FOR CENTERING CONVEYOR BELTS

The invention concerns a belt steering assembly in a conveyor for centring conveyor belts, wherein
- a steering bracket supports at least one steering roller for the conveyor belt, which steering bracket is rotatably attached to a first fulcrum whose axis extends perpendicularly to the conveyor belt, and where at a distance in the belt's transport direction from the first fulcrum via a first rotating joint the steering bracket is connected to
- a lever arm which extends substantially in the conveyor belt's longitudinal direction, and which at a distance in the belt's transport direction from the first rotating joint is attached to a second fulcrum whose axis extends perpendicularly to the conveyor belt, and at a distance in the belt's transport direction from the second fulcrum via a second rotating joint is connected to
- a guide bracket which supports guide rollers arranged to about against each of the belt's outer sides, for reacting to a lateral displacement of the conveyor belt, which guide bracket is connected via a third rotating joint to
- a parallel stay which extends parallel to the lever arm and extends to a third fulcrum, whose axis extends perpendicularly to the conveyor belt.

Use of the belt steering assembly for steering a conveyor belt during loading, wherein a laterally adjustable conveyor belt is moved past a loading device for loading of a preferably granulated material, and where the centre of gravity of the loaded material falls at the side of the conveyor belt's central portion when the conveyor belt is located in a neutral position:

Belt steering assemblies are used amongst other things to guide conveyor belts in processing plants for various types of materials such as granulated ores.

In De 174491 there is disclosed a conveyor belt device for correcting lateral misalignments which occur during operation and thus return the belt to its normal position. A set of steering rollers for the conveyor belt is mounted on a plate which is rotatably attached to the base. On to the roatable plate there is mounted an arm with a transverse stay. The arm may be jointed and rotatable about a rotating joint which is attached to the base. To the transverse stay there are attached guide rollers which run along the edge of the conveyor belt, and which in the event of a lateral misalignment of the belt transfer the displacement to the transverse stay. The displacement is transferred to the lever arm, which in turn transfers the displacement to the plate with the result that the axes of the steering rollers are tilted, thus returning the conveyor belt to its normal position.

In NO 178 853 there is disclosed a belt steering assembly of a similar type, but where the lever arm is rotatably attached both to the plate which holds the steering rollers and the transverse stay which holds the guide rollers. The lever arm is rotatably attached at a fixed point located at a distance from the rotating fastenings in the plate and the transverse stay, and a rotatable parallel stay is mounted parallel to the lever arm, between the transverse stay and a fixed based in the form of a beam, with the result that the transverse stay always remains standing at right angles to the conveyor belt's centre line.

Norwegian patent application 962268 describes a reversible belt steering assembly where the actual steering function is implemented in the same way as in NO 178 853, but where there are two sets of guide rollers arranged on opposite sides of the steering rollers, and where the guide rollers can be connected and disconnected in relation to the steering rollers by means of a switch mechanism, depending on the belt's direction of travel.

Known belt steering assemblies of the type which is described in DE 174491 and similar types have a tendency to cause wandering and misalignment of the conveyor belt, especially when there is uneven loading or uneven weight distribution, thus causing wear along the edges of the belt.

In comparison with these other known belt steering assemblies the belt steering assembly which is disclosed in NO 178 853 provides a smoother movement of the conveyor belt and consequently less wear and a longer working life.

Steering of the conveyor belt with a belt steering assembly as described in NO 178 853, however, is not without problems, since both understeering and oversteering can occur, with consequent uneven running.

When conveyor belts are used for moving materials within the processing industry, such as the movement of granulated ores, uneven loading on the belt resulting from the material being placed outside the belt's central portion is a common problem. The problem can, of course, be solved by moving the loading apparatus or the conveyor belt's foundation, but both of these measures require fairly radical intervention and are consequently undersirable.

The object of the invention is to provide a belt steering assembly for centring conveyor belts of the type which is described in NO 178 853, but where the steering of the belt is performed without understeering or oversteering.

A further object of the invention is to provide a method for loading on to a conveyor belt in order to avoid uneven loading.

These objects are achieved according to the invention with a belt steering assembly and a method of the type mentioned in the introduction, characterized by the features which are indicated in the claims.

The belt steering assembly according to the invention is based on NO 178 853, and constitutes a further development thereof. This further development is based on the fact that the surprising discovery has been made that specific geometrical factors associated with the belt steering assembly are of crucial importance for the function of the belt steering assembly. These geometrical factors are not associated with dimensioning or optimization, but are rather associated with exchange ratios when the movement is transferred from the guide rollers to the steering rollers. With a design of the belt steering assembly according to the invention a hitherto unknown stability is obtained in the belt. By means of the interaction between the different parts of the belt steering assembly, minute lateral misalignments of the conveyor belt are amplified by means of the guide rollers' laterally directed displacement and transferred to the steering rollers which are rotated exactly the right amount to return the conveyor belt to its centre position. This also enables the belt to be adjusted in the lateral direction without affecting the stability.

The method according to the invention is made possible due to the fact that the belt steering assembly according to the invention permits a precise and even adjustment of the conveyor belt.

Figure 2:
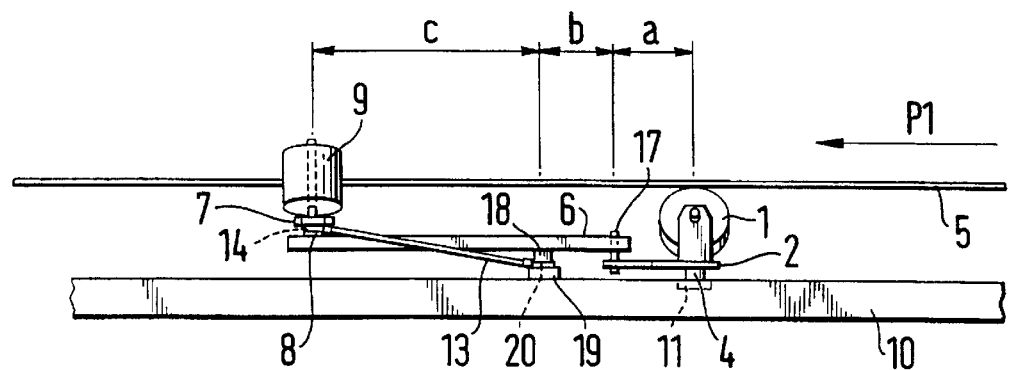
Figure 3:
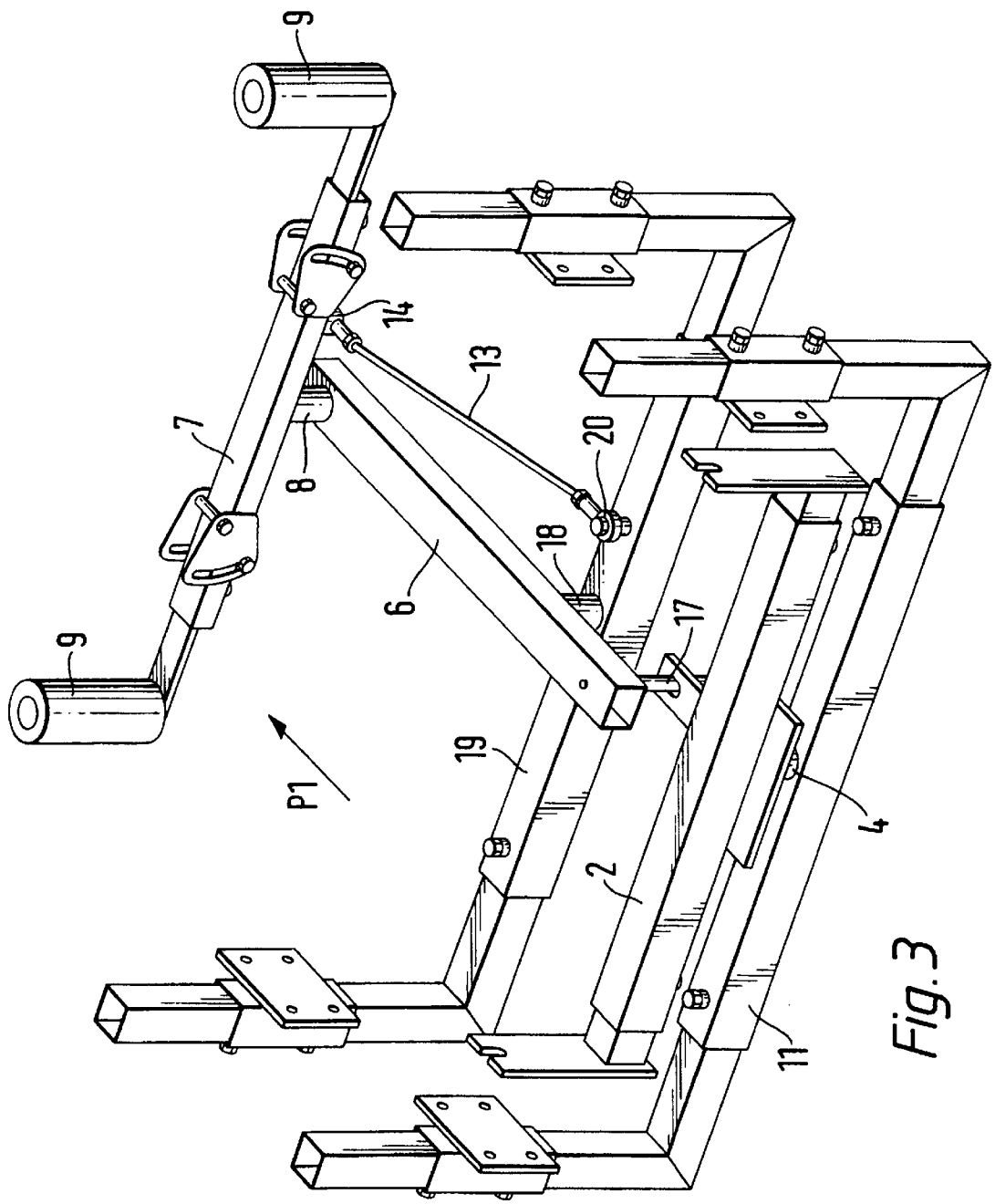
Figure 4:
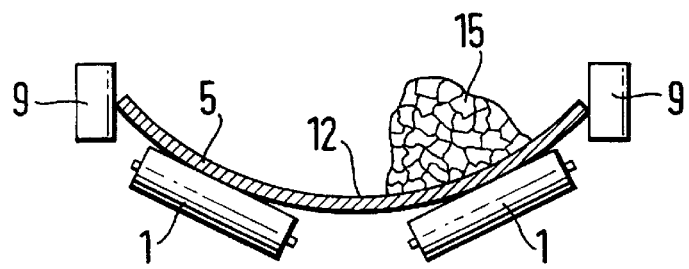
Figure 5:
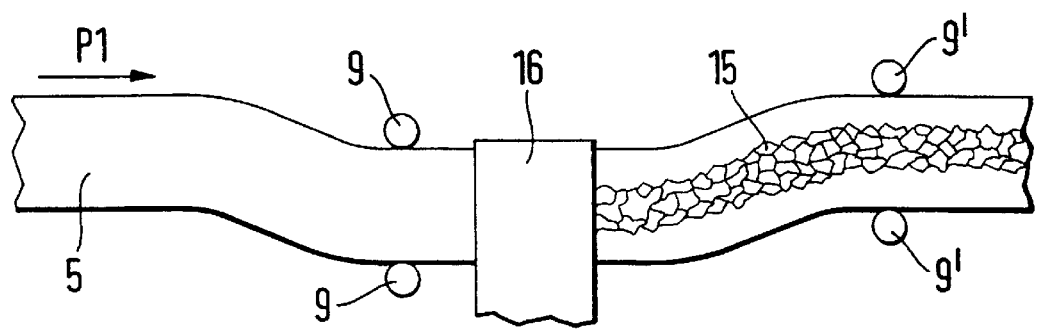
Figure 6:
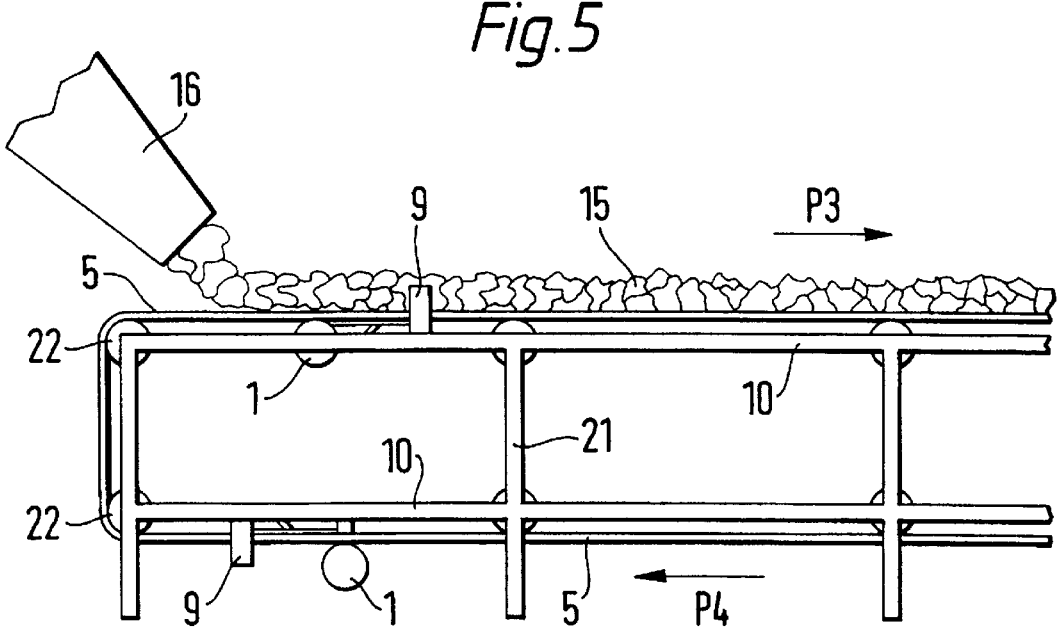

The invention will now be described in more detail in connection with a description of a specific embodiment and with reference to the drawing, in which:

FIG. 1 is an underside view of a belt steering assembly according to the invention, FIG. 2 is a sectional elevation of the belt steering assembly in FIG. 1, FIG. 3 is a perspective view of a belt steering assembly according to the invention, FIG. 4 is a cross section through a conveyor belt where loaded material falls outside the conveyor belt's central portion, FIG. 5 is a top view of a conveyor belt where loading is being performed according to the invention, and FIG. 6 is a sectional elevation of a conveyor belt where loading is being performed according to the invention.

The same reference numerals are used for corresponding parts in all the figures.

FIGS. 1 and 2 illustrate a belt steering assembly according to the invention. A steering bracket 2 supports two steering rollers 1 for steering a conveyor belt 5 when it travels in its transport direction P1, which coincides with the belt's longitudinal direction. The steering bracket 2 is rotatably attached at a first fulcrum 4, which is located on a beam 11 which extends between side members 10 on the side of the belt steering assembly. The steering bracket 2 is connected to a lever arm 6 via a first rotating joint 17 at a distance a in the belt's transport direction P1 from the first fulcrum 4.

The lever arm 6 extends in the conveyor belt's longitudinal direction, and at a distance b in the belt's transport direction P1 from the first rotating joint 17 is attached at a second fulcrum 18 which is located on a beam 19 between the side members 10. At a further distance c in the belt's transport direction from the second fulcrum 18 the lever arm 6 is connected via a second rotating joint 8 to a guide bracket 7.

The guide bracket 7 supports guide rollers 9 arranged to abut against each of the belt's 5 outer sides, for reacting to a lateral displacement of the conveyor belt in direction P2. A parallel stay 13 extends parallel to the lever arm 6 and is attached at one end to the guide bracket 7 by a third rotating joint 14, and at the other end is attached to a third fulcrum 20 on the beam 19.

Both the first, second and third fulcrums, and the first, second and third rotating joints have axes which extend perpendicularly to the conveyor belt.

In the illustrated embodiment the length of the parallel stay 13 is equal to the distance c between the second fulcrum 18 and the second rotating joint 8, and the third fulcrum 20 is located in relation to the conveyor belt's longitudinal direction in the same transverse plane as the second fulcrum 18. The distance between the rotating joints 8 and 14 are equal to the distance between the fulcrums 18 and 20, and a parallelogram is thereby formed defined by the lines between the points 18, 8, 14 and 20. A displacement of the guide bracket 7 with the guide rollers 9 will therefore always extend perpendicularly to the conveyor belt's longitudinal direction.

The conveyor belt and the belt steering assembly are illustrated in FIG. 1 in their neutral position, i.e. a position in which the first and second fulcrums 4, 18 and the first and second rotating joints 17, 8 are substantially located along the conveyor belt's centre line, and the belt is not subjected to any laterally directed correction from the belt steering assembly. A lateral displacement of the conveyor belt in direction P2 from the neutral position will be transferred to the guide rollers 9 and on to the guide bracket 7, then on to the lever arm 6, the steering bracket 2 and the steering rollers 1 which will guide the conveyor belt 5 back to the neutral position.

According to the invention the ratio between the distance b between the first rotating joint 17 and the second fulcrum 18 and the distance c between the second fulcrum 18 and the second rotating joint 8 should be between 1:2 and 1:5, preferably between 1:2.5 and 1:3.5 and most preferred circa 1:3.

When this condition has been fulfilled a high degree of stability is achieved in the belt steering assembly. Even minute lateral misalignments of the conveyor belt are amplified by the length ratio in the lever arm 6 and transferred to the support rollers 1 which are rotated exactly the right amount to return the conveyor belt to its neutral position.

If the above-mentioned ratio is greater than 1:2 the conveyor belt steerer is understeered, i.e. the movement which is transferred from the guide rollers 9 to the steering rollers 1 in the event of a lateral misalignment of the conveyor belt is not great enough to rotate the steering rollers sufficiently to readjust the conveyor belt to the neutral position.

If the above-mentioned ratio is less than 1:5 the conveyor belt steerer is oversteered, i.e. the movement which is transferred from the guide rollers 9 to the steering rollers 1 in the event of a lateral misalignment of the conveyor belt will rotate the steering rollers too much, thus causing the conveyor belt to be adjusted beyond the neutral position and in the opposite direction. This gives rise to oscillation.

In the embodiment illustrated in FIGS. 1 and 2 the distance a between the first fulcrum 4 and the first rotating joint 17 is equal to the distance b between the first rotating joint 17 and the second fulcrum 18. This is related to the ratio between the distances b and c, and an alteration of the ratio between a and b will affect the belt steering device's adjustment possibilities, sensitivity and stability, and will also affect the preferred ratio between b and c.

In the embodiment in FIG. 1 the steering rollers 1 are further mounted about a common axis which extends parallel with the belt 5, across the belt's longitudinal direction. Furthermore, the axis through the first fulcrum 4 crosses the extension of the steering rollers' 1 axis. This is a preferred embodiment for a level belt, but a number of variants are, of course, possible, and this will be exemplified in connection with FIG. 4. It is also obvious that a change in the geometry in connection with the steering rollers' axes and the position of the first fulcrum will also affect the preferred ratio between b and c.

The embodiment illustrated in FIGS. 1 and 2 is a so-called oversteerer, i.e. a belt steerer which is located above the side members 10 and is designed to steer the conveyor belt when it moves in its transport direction on the top of a stand.

FIG. 3 illustrates a so-called understeerer, i.e. a belt steerer which is located below the side members 10 and is used to steer the conveyor belt when it moves in a return direction on the underside of the stand. The understeerer in FIG. 3 has the same principle design as the oversteerer in FIGS. 1 and 2, but the design is slightly different on account of the attachment in the side members. The steering rollers 1 are not shown. The designations understeerer and oversteerer should not be confused with understeered and oversteered as discussed above.

FIG. 3 further illustrates how the beams 11 and 19 are arranged to be laterally adjustable by means of telescopically movable square tubes. The first, second and third fulcrums, indicated by 4, 18 and 20 respectively, are thereby laterally adjustable in relation to the conveyor belt's longitudinal direction. The possibility is thereby provided for lateral adjustment of the conveyor belt's neutral position.

The belt steering assembly's dimensions can be adjusted by means of the telescopically movable square tubes in such a fashion that they can be mounted together with the most commonly used conveyor belts. The belt steering assembly can therefore also employ existing supporting rollers as steering rollers, which may be of different dimensions in the various fields. This denotes an economic advantage in comparison with known designs of belt steerers.

FIG. 3 further illustrates how the guide bracket 7 is also arranged to be laterally adjustable by means of telescopically movable square tubes, thus allowing the clearance between the guide rollers 9 and the outer edges of the belt 5 to be adjusted. In a preferred embodiment this clearance in the neutral position comes to between 1 and 10 mm, preferably between 3 and 8 mm and most preferred 5–6 mm.

It has been found that the above-mentioned preferred clearances provide the best compromise between a low level of wear on the sides of the conveyor belt and a continuous adjustment of the conveyor belt. Even small lateral movements of the belt will be transferred to the steering rollers, and this constant adjustment will generate rhythmical movement of the belt steering assembly which prevents the deposit of random materials, or possibly ice formation, on the belt steering assembly's moving parts.

FIG. 4 is a cross section through a curved conveyor belt 5 which rests on tilted steering rollers 1. As the rigidity and elasticity of the belt are altered with time the belt will become more and more curved with the same load. The height and spacing of the guide rollers 9 can be adjusted at regular intervals to ensure that the guide rollers 9 always follow the edge of the belt 5.

The belt in FIG. 4 is located in its neutral position, and a load in the form of a granulated material 15 is added on the side of the conveyor belt's central section 12, which is highly undersirable as it leads to uneven loading and increased wear on the conveyor belt.

FIG. 5 is a top view of a laterally adjustable conveyor belt 5 which is moved past a loading device 16 for loading of a granulated material 15 by means of the method according to the invention. Before loading the conveyor belt 5 is steered laterally to a position where the centre of gravity of the loaded material falls on the conveyor belt's central section, and after loading the conveyor belt is guided laterally to its neutral position. The belt thereby achieves a far smoother running and is less subject to wear.

In the embodiment illustrated in FIG. 5 the laterally directed steering of the conveyor belt is performed with belt steerers, where a belt steerer with guide rollers 9 is placed in front of the loading device 16 in order to steer the conveyor belt out of its neutral position, and a belt steerer with guide rollers 9' is placed behind the loading device in order to steer the conveyor belt back to its neutral position.

FIG. 6 illustrates a preferred embodiment of the method according to the invention, where the conveyor belt 5 is located in a stand 21 with a transport side for the material on the top of the stand and a return side for the belt on the underside of the stand. The conveyor belt 5 is guided by means of supporting rollers 22 and not shown drive devices from the underside to the top, as illustrated by the arrows P3 and P4. A loading device 16 is placed at the end of the stand for loading of material 15 on to the belt immediately after it has moved from the underside to the top of the stand.

When the method in FIG. 6 is implemented the laterally directed steering of the conveyor belt 5 before loading is performed with an understeerer on the underside of the stand, attached to lower side members 10. Similarly, the laterally directed steering of the conveyor belt after loading is performed with an oversteerer on the top of the stand, attached to upper side members 10.

By means of the belt steering assembly according to the invention, where the advantageous mechanism for transferring the movement from the guide rollers to the steering rollers is combined with the laterally directed adjustability of the conveyor belt's neutral position, the possibility is achieved of realising the method according to the invention.

Thus there is a clear and logical connection between the belt steering assembly and the method according to the invention.

The invention has been explained in the above with reference to a specific embodiment. It is obvious, however, that a number of variations of the invention are possible, especially associated with the belt steering assembly's geometry. It should be understood, therefore, that a belt steering assembly where the relative positions of the attachment points and rotating joints are somewhat displaced in horizontal and/or vertical plane in relation to the described belt steering assembly will also be within the scope of the invention as it is defined in the claims.

What is claimed is:

1. A belt steering assembly in a conveyor for centring conveyor belts (5), wherein a steering bracket (2) supports at least one steering roller (1) for the conveyor belt (5), which steering bracket (2) is rotatably attached to a first fulcrum (4) whose axis extends perpendicularly to the conveyor belt, and where at a distance (a) in the belt's transport direction (P1) from the first fulcrum (4) via a first rotating joint (17) the steering bracket is connected to a lever arm (6) which extends substantially in the conveyor belt's longitudinal direction, and which at a distance (b) in the belt's transport direction (P1) from the first rotating joint (17) is attached to a second fulcrum (18) whose axis extends perpendicularly to the conveyor belt, and at a distance (c) in the belt's transport direction from the second fulcrum (18) via a second rotating joint (8) is connected to a guide bracket (7) which supports guide rollers (9) arranged to abut against each of the belt's (5) outer sides, for reaction to a lateral displacement (P2) of the conveyor belt, which guide bracket (7) is connected via a third rotating joint (14) to a parallel stay (13) which extends parallel to the lever arm (6) and extends to a third fulcrum (20), whose axis extends perpendicularly to the conveyor belt, characterized in that the ratio between the distance (b) between the first rotating joint (17) and the second fulcrum (18) and the distance (c) between the second fulcrum (18) and the second rotating joint (8) is between 1:5, and that the first, second and third fulcrums are laterally adjustable in relation to the conveyor belt's longitudinal direction, by being fixed to the conveyor by telescopically movable tubes, for lateral adjustment of a neutral position for the conveyor belt.

2. A belt steering assembly according to claim 1, characterized in that the steering rollers (1) are mounted about axes which extend substantially across the belt's (5) longitudinal direction, and that the axis through the first fulcrum (4) crosses or substantially crosses the extension of the steering rollers' (1) axes of rotation.

3. A belt steering assembly according claim 1, characterized in that the distance (a) between the first fulcrum (4) and the first rotating joint (17) is equal to or substantially equal to the distance (b) between the first rotating joint (17) and the second fulcrum (18).

4. A belt steering assembly according to claim 1, characterized in that the length of the parallel stay (13) is equal to or substantially equal to the distance (c) between the second fulcrum (18) and the second rotating joint (8), and that the third fulcrum (20) in relation to the conveyor belt's longitudinal direction is located in the same or substantially the same transverse plane as the second fulcrum (18).

5. A belt steering assembly according to claim 1, characterized in that the guide rollers (9) are arranged to be laterally adjustable, by means of telescopic tubes, and that the guide rollers (9) are arranged to abut against each of the belt's (5) outer sides with a clearance which in the neutral position comes to between 1 and 10 mm.

6. Use of the belt steering assembly according to claim 1 for steering a conveyor belt during loading, wherein a laterally adjustable conveyor belt (5) is moved past a loading device (16) for loading of a preferably granulated material (15), and where the centre of gravity of the loaded material (15) falls at the side of the conveyor belt's central portion (12) when the conveyor belt is located in a neutral position, characterized in that before loading the conveyor belt (5) is steered laterally by a first belt steering assembly to a position where the centre of gravity of the loaded material (15) falls on the conveyor belt's central portion (12), and after loading the conveyor belt is steered laterally by a second belt steering assembly to its neutral position.

7. Use of a belt steering assembly according to claim 6, where the conveyor belt (5) is placed in a stand (21) with a transport side for the material in the top of the stand and a return side for the belt on the underside of the stand, and where the loading is performed on the belt's transport side at the end of the stand where the belt moves from the underside to the top of the stand, characterized in that before loading the laterally directed steering of the conveyor belt (5) is performed with a belt steering assembly on the underside of the stand, and that after loading the laterally directly steering of the conveyor belt is performed with a belt steering assembly on the top of the stand.

* * * * *